(12) United States Patent
Huang

(10) Patent No.: US 11,865,451 B2
(45) Date of Patent: Jan. 9, 2024

(54) OBJECT CONTROL METHOD AND APPARATUS, STORAGE MEDIUM, AND ELECTRONIC DEVICE

(71) Applicant: Tencent Technology (Shenzhen) Company Limited, Shenzhen (CN)

(72) Inventor: Xiongfei Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 387 days.

(21) Appl. No.: 17/316,522

(22) Filed: May 10, 2021

(65) Prior Publication Data

US 2021/0260484 A1 Aug. 26, 2021

Related U.S. Application Data

(63) Continuation of application No. PCT/CN2020/077441, filed on Mar. 2, 2020.

(30) Foreign Application Priority Data

Apr. 4, 2019 (CN) .......................... 201910272526.8

(51) Int. Cl.
  *A63F 13/58* (2014.01)
  *A63F 13/803* (2014.01)
  *G06F 3/04886* (2022.01)

(52) U.S. Cl.
  CPC ............ *A63F 13/58* (2014.09); *A63F 13/803* (2014.09); *G06F 3/04886* (2013.01)

(58) Field of Classification Search
  CPC .... A63F 13/58; A63F 13/803; A63F 13/2145; A63F 13/35; A63F 13/533; G06F 3/04886; G06F 3/0488
  See application file for complete search history.

(56) References Cited

U.S. PATENT DOCUMENTS 5,755,620 A * 5/1998 Yamamoto .............. A63F 13/10
  463/34
9,687,741 B1 * 6/2017 Kim .................... A63F 13/2145
  (Continued)

FOREIGN PATENT DOCUMENTS

CN 106861186 A 6/2017
CN 109513210 A 3/2019
  (Continued)

OTHER PUBLICATIONS

English translation of CN 109513210 A provided by ip.com (Year: 2019).*

(Continued)

*Primary Examiner* — Seng H Lim
(74) *Attorney, Agent, or Firm* — Morgan, Lewis & Bockius LLP

(57) ABSTRACT

This application discloses an object control method performed at a terminal device. The method includes: detecting, in a running process of a round of game, a target angle generated by a target object controlled by a user of the terminal device during execution of a target action, the target angle being an included angle between a forward orientation of the target object and a sliding direction of the target object; automatically triggering, when the target angle reaches a trigger threshold, adjustment of a key state of a target virtual key; detecting, when the key state of the target virtual key is a touch-enabled state, a touch operation performed on the target virtual key; and controlling, in response to the touch operation, the target object to perform a target operation matching the target virtual key.

20 Claims, 10 Drawing Sheets

(56) References Cited

U.S. PATENT DOCUMENTS

| | | | |
|---|---|---|---|
| 10,449,451 B2* | 10/2019 | Utsugi | A63F 13/573 |
| 10,946,277 B2* | 3/2021 | Liu | A63F 13/92 |
| 11,135,513 B2* | 10/2021 | Li | A63F 13/5378 |
| 11,185,773 B2* | 11/2021 | Huang | A63F 13/537 |
| 11,344,810 B2* | 5/2022 | Huang | A63F 13/57 |
| 11,607,610 B2* | 3/2023 | Huang | A63F 13/42 |
| 2007/0209436 A1* | 9/2007 | Akita | A63F 13/57 |
| | | | 702/141 |
| 2007/0269054 A1* | 11/2007 | Takagi | A63F 13/54 |
| | | | 381/71.4 |
| 2008/0218529 A1* | 9/2008 | Okubo | A63F 13/57 |
| | | | 345/619 |
| 2012/0327098 A1* | 12/2012 | Cheng | G06F 3/04842 |
| | | | 345/566 |
| 2019/0336860 A1* | 11/2019 | Yabuki | A63F 13/803 |
| 2019/0336863 A1* | 11/2019 | Hayashi | A63F 13/42 |
| 2020/0078668 A1* | 3/2020 | Yabuki | G06F 3/04886 |
| 2020/0086209 A1* | 3/2020 | Yabuki | G06F 3/038 |
| 2020/0086214 A1* | 3/2020 | Yabuki | A63F 13/803 |
| 2021/0008445 A1* | 1/2021 | Hayashi | G06F 3/0346 |
| 2021/0016172 A1* | 1/2021 | Huang | A63F 13/92 |
| 2021/0245053 A1* | 8/2021 | Weng | A63F 13/22 |
| 2021/0260484 A1* | 8/2021 | Huang | A63F 13/2145 |
| 2021/0283500 A1* | 9/2021 | Huang | A63F 13/57 |

FOREIGN PATENT DOCUMENTS

| | | |
|---|---|---|
| CN | 109999499 A | 7/2019 |
| JP | 2016120131 A | 7/2016 |

OTHER PUBLICATIONS

Tencent Technology, ISR, PCT/CN2020/077441, dated May 29, 2020, 2 pgs.

Tencent Technology, WO, PCT/CN2020/077441, dated May 29, 2020, 5 pgs.

Tencent Technology, IPRP, PCT/CN2020/077441, dated Sep. 28, 2021, 6 pgs.

* cited by examiner

OBJECT CONTROL METHOD AND APPARATUS, STORAGE MEDIUM, AND ELECTRONIC DEVICE

CROSS-REFERENCE TO RELATED APPLICATIONS

This application is a continuation application of PCT Patent Application No. PCT/CN2020/077441, entitled "OBJECT CONTROL METHOD AND DEVICE, AND STORAGE MEDIUM AND ELECTRONIC DEVICE" filed on Mar. 2, 2020, which claims priority to Chinese Patent Application No. 201910272526.8, filed with the State Intellectual Property Office of the People's Republic of China on Apr. 4, 2019, and entitled "OBJECT CONTROL METHOD AND APPARATUS, STORAGE MEDIUM, AND ELECTRONIC DEVICE", all of which are incorporated herein by reference in their entirety.

FIELD OF THE TECHNOLOGY

This application relates to the field of computers, and specifically, to object control.

BACKGROUND OF THE DISCLOSURE

In game scenes of racing game applications, different game props or game skills are often configured for contestants. However, to ensure the fairness of a round of game, triggering conditions are also synchronously configured for the foregoing game props or game skills. For example, the triggering conditions may include an energy trigger threshold. That is, in a running process of the round of game, only when the foregoing triggering conditions are met, the contestants can use the corresponding game props or release the corresponding game skills. For example, after a contestant is controlled to complete a drift action, a corresponding energy value may be accumulated for the contestant. When the energy value is accumulated and reaches the energy trigger threshold, the contestant obtains a permission to use a game prop. For example, the game prop may be a prop that rewards the contestant for accelerating in the running process of the game.

That is, in the current running process of the game, it is often necessary to control the contestant to repeat the drift action multiple times to accumulate the energy value, so that the energy value can finally accumulate to the foregoing energy trigger threshold. In other words, in an object control method provided in the related art, it is usually necessary to control an object to repeat the same operation multiple times, to use a game prop or release a game skill, resulting in the problem of increased difficulty in the operation of object control.

For the foregoing problem, no effective solution has been provided yet.

SUMMARY

Embodiments of this application provide an object control method and apparatus, a storage medium, and an electronic device, to at least resolve the technical problem of high operational complexity due to the need of a player to repeat manual operations multiple times in an object control method provided in the related art.

According to an aspect of the embodiments of this application, an object control method is provided, applicable to a network device, the method including: detecting, in a running process of a round of game, a target angle generated by a target object controlled by a user of the terminal device during execution of a target action, the target angle being an included angle between a forward orientation of the target object and a sliding direction of the target object; triggering adjustment of a key state of a target virtual key when the target angle reaches a trigger threshold; detecting, when the key state of the target virtual key is a touch-enabled state, a touch operation performed on the target virtual key; and controlling, in response to the touch operation, the target object to perform a target operation matching the target virtual key.

According to another aspect of the embodiments of this application, an object control apparatus is further provided, including: a first detection unit, configured to detect, in a running process of a round of game, a target angle generated by a target object controlled by a user of the terminal device during execution of a target action, the target angle being an included angle between a forward orientation of the target object and a sliding direction of the target object; a triggering unit, configured to trigger adjustment of a key state of a target virtual key when the target angle reaches a trigger threshold; a second detection unit, configured to detect, when the key state of the target virtual key is a touch-enabled state, a touch operation performed on the target virtual key; and a control unit, configured to control, in response to the touch operation, the target object to perform a target operation matching the target virtual key.

According to still another aspect of the embodiments of this application, a non-transitory computer readable storage medium is further provided. The non-transitory computer readable storage medium stores a plurality of computer programs, and the computer programs are configured to perform, when run, the foregoing object control method.

According to still another aspect of the embodiments of this application, a terminal device is further provided, including a memory, a processor, and a plurality of computer programs stored in the memory and executable on the processor. The processor performs the foregoing object control method by using the computer program.

According to an aspect of the embodiments of this application, a computer program product including instructions is further provided, the computer program product, when run on a computer, causing the computer to perform the foregoing object control method.

In the embodiments of this application, in a running process of a round of game, a target angle generated by a target object controlled by a user of the terminal device during execution of a target action is detected, whether to automatically trigger adjustment of a key state of a target virtual key is determined according to the target angle, and when the key state of the target virtual key is a touch-enabled state, a touch operation performed on the target virtual key is detected, and in response to the touch operation, the target object is controlled to perform a target operation matching the target virtual key. That is, triggering automatic adjustment of the key state of the target virtual key is controlled according to the detected target angle generated by the target object during execution of the target action, to simplify an adjustment operation on the key state of the target virtual key, thereby simplifying the process of controlling the target object, and further overcoming the problem of high operational complexity due to the need of a player to repeat manual operations multiple times in the related art.

Further, while the adjustment operation is simplified, whether a touch operation is performed on the target virtual key of which the key state is the touch-enabled state can also be detected in time, to respond to the touch operation and control the target object to perform the target operation matching the target virtual key in time, thereby achieving the objective of improving the control efficiency of controlling the foregoing object to perform the target operation.

BRIEF DESCRIPTION OF THE DRAWINGS

The accompanying drawings described herein are used to provide a further understanding of this application, and form a part of this application. Exemplary embodiments of this application and descriptions thereof are used to explain this application, and do not constitute any inappropriate limitation to this application. In the accompanying drawings.

DESCRIPTION OF EMBODIMENTS

Figure 1:
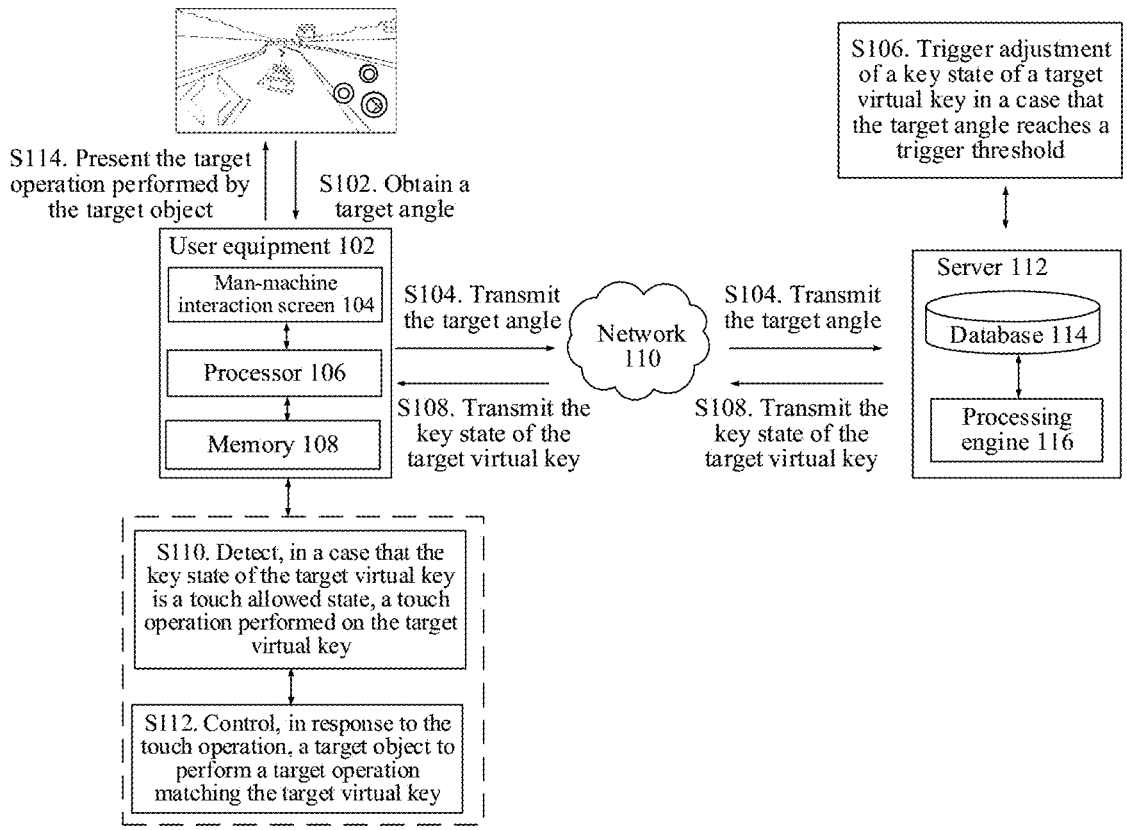
FIG. 1 is a schematic diagram of a network environment of an optional object control method according to an embodiment of this application.

To make a person skilled in the art better understand solutions of this application, the technical solutions in embodiments of this application are clearly and completely described below with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

The terms such as "first" and "second" in the specification, the claims, and the foregoing accompanying drawings of this application are intended to distinguish between similar objects, but are not necessarily used for describing a particular sequence or a chronological order. It is to be understood that the data termed in such a way are interchangeable in proper circumstances, so that the embodiments of this application described herein can be implemented in other orders than the order illustrated or described herein. Moreover, the terms "include", "comprise" and any other variants mean to cover the non-exclusive inclusion, for example, a process, method, system, product, or device that includes a list of units is not necessarily limited to those expressly listed units, but may include other units not expressly listed or inherent to such a process, method, system, product, or device.

According to an aspect of the embodiments of this application, an object control method is provided. In some embodiments, in an optional implementation, the foregoing object control method may be applied to, but is not limited to, a network environment shown in FIG. 1. It is assumed that a game application client (a racing game application client shown in FIG. 2) is installed in user equipment 102. The user equipment 102 includes a man-machine interaction screen 104, a processor 106, and a memory 108. The man-machine interaction screen 104 is configured to detect a man-machine interaction operation (such as a touch operation) through a man-machine interaction interface corresponding to the foregoing client. The processor 106 is configured to generate a corresponding operation instruction according to the man-machine interaction operation and control a target object controlled by the foregoing client to perform a corresponding action or operation in response to the operation instruction. The memory 108 is configured to store the foregoing operation instruction and attribute information related to the target object. For example, the attribute information may include, but is not limited to: key state information of a virtual key configured to control a target virtual object in a man-machine interaction interface presented on the client.

S102. The user equipment 102 detects, in a running process of a round of game, a target angle generated by a target object controlled by a user of the terminal device during execution of a target action, the target angle being an included angle between a forward orientation of the target object and a sliding direction of the target object. S102. Obtain the detected target angle. Then, the user equipment 102 may perform S104 to transmit the target angle to a server 112 through a network 110. The server 112 includes a database 114 and a processing engine 116. The database 114 is configured to store a trigger threshold and key response logic corresponding to the virtual key. The processing engine 116 is configured to compare the target angle and the trigger threshold to determine whether to trigger adjustment of a key state of a target virtual key. Then, the server 112 performs S106 to S108: automatically triggering adjustment of the key state of the target virtual key when the target angle reaches the trigger threshold, and synchronously transmitting the key state of the target virtual key to the user equipment 102.

Further, the processor 106 in the user equipment 102 performs S110 to S112: determining whether the key state of the target virtual key is a touch-enabled state, detecting a touch operation performed on the target virtual key when the key state of the target virtual key is the touch-enabled state, and controlling the target object to perform a target operation matching the target virtual key in response to the touch operation detected. Then, in S114, the foregoing target operation performed by the target object is presented in a man-machine interaction interface of the client.

Figure 2:
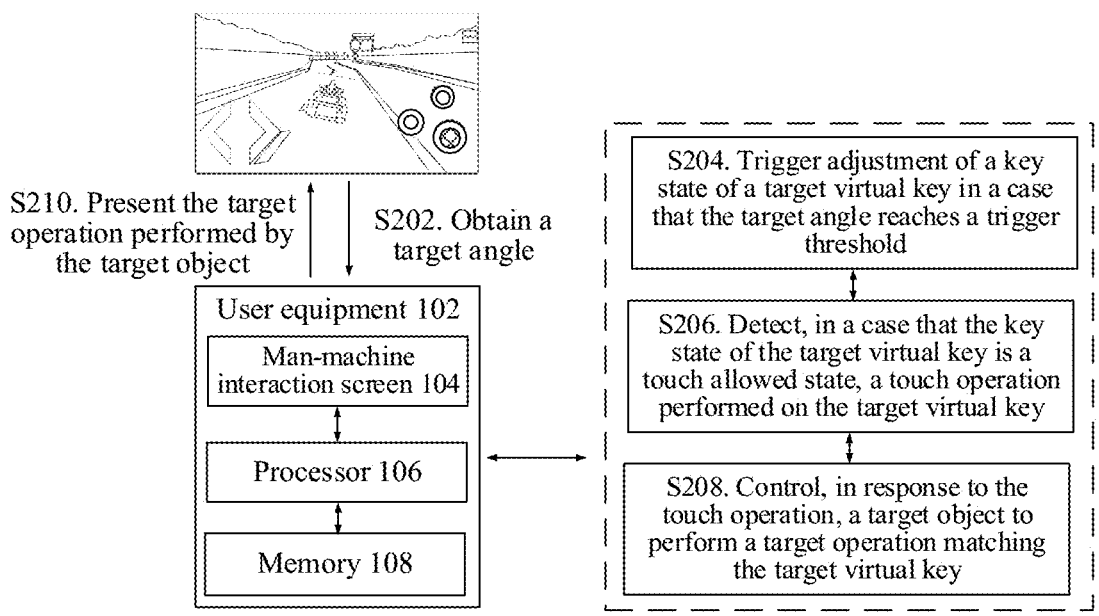
FIG. 2 is a schematic diagram of a hardware environment of an optional object control method according to an embodiment of this application.

In addition, in an optional implementation, the object control method is further applicable to, but not limited to, a hardware environment shown in FIG. 2. It is still assumed that a game application client (a racing game application client shown in FIG. 1) is installed in the user equipment 102. The user equipment 102 includes the man-machine interaction screen 104, the processor 106, and the memory 108.

The user equipment 102 detects, in a running process of a round of game, a target angle generated by a target object controlled by a user of the terminal device during execution of a target action, the target angle being an included angle between a forward orientation of the target object and a sliding direction of the target object. S202. Obtain the detected target angle. Then, the user equipment 102 performs S204 to S208 through the processor 106: triggering adjustment of a key state of a target virtual key when the target angle reaches a trigger threshold and determining whether the key state of the target virtual key is a touch-enabled state, detecting, when the key state of the target virtual key is the touch-enabled state, a touch operation performed on the target virtual key, and controlling the target object to perform a target operation matching the target virtual key in response to the touch operation detected. Then, in S210, the foregoing target operation performed by the target object is presented in a man-machine interaction interface of the client.

In this embodiment, in a running process of a round of game, a target angle generated by a target object controlled by a user of the terminal device during execution of a target action is detected, whether to trigger adjustment of a key state of a target virtual key is determined according to the target angle, and when the key state of the target virtual key is a touch-enabled state, a touch operation performed on the target virtual key is detected, and in response to the touch operation, the target object is controlled to perform a target operation matching the target virtual key. That is, triggering automatic adjustment of the key state of the target virtual key is controlled according to the detected target angle generated by the target object during execution of the target action, to simplify an adjustment operation on the key state of the target virtual key, thereby simplifying the operation of controlling the target object, and further overcoming the problem of high operational complexity due to the need of a player to repeat manual operations multiple times to trigger adjustment of the key state in the related art. Further, while the adjustment operation is simplified, whether a touch operation is performed on the target virtual key of which the key state is the touch-enabled state can also be detected in time, to respond to the touch operation and control the target object to perform the target operation matching the target virtual key in time, thereby achieving the objective of improving the control efficiency of controlling the foregoing object to perform the target operation.

In some embodiments, in this embodiment, the user equipment may be, but is not limited to, a terminal device that supports running of an application client, for example, a mobile phone, a tablet computer, a notebook computer, or a PC. The server and the user equipment may perform data exchange by using, but not limited to, a network. The network may include, but is not limited to, a wireless network or a wired network. The wireless network includes: Bluetooth, Wi-Fi, and another network implementing wireless communication. The wired network may include, but not limited to: a wide area network, a metropolitan area network, and a local area network. This is merely an example, and this embodiment is not limited thereto.

Figure 3:
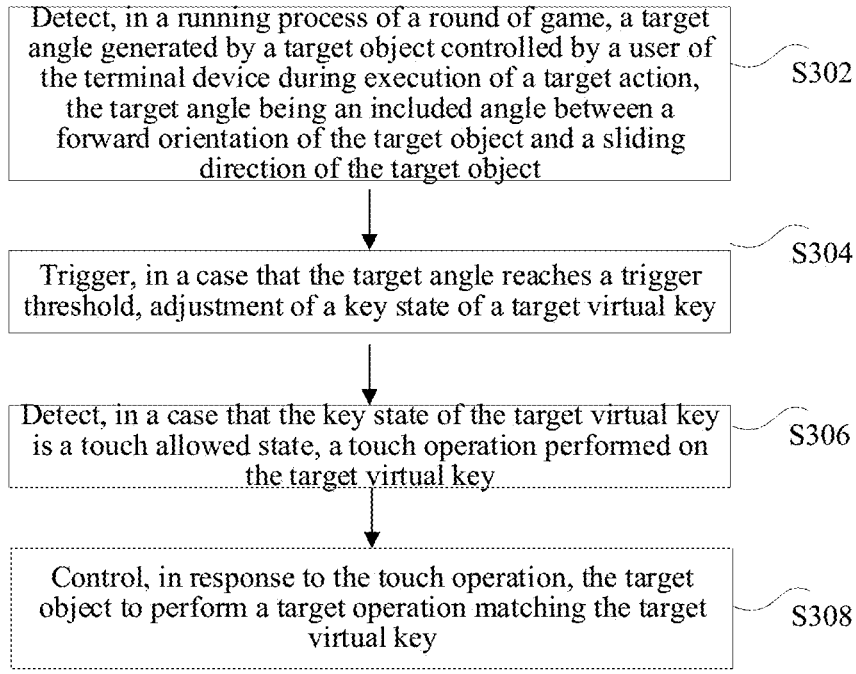
FIG. 3 is a flowchart of an optional object control method according to an embodiment of this application.

In some embodiments, as an optional implementation, as shown in FIG. 3, the foregoing object control method includes the following steps:

S302. Detect, in a running process of a round of game, a target angle generated by a target object controlled by a user of the terminal device during execution of a target action, the target angle being an included angle between a forward orientation of the target object and a sliding direction of the target object.

S304. Trigger adjustment of a key state of a target virtual key when the target angle reaches a trigger threshold.

S306. Detect, when the key state of the target virtual key is a touch-enabled state, a touch operation performed on the target virtual key.

S308. Control, in response to the touch operation, the target object to perform a target operation matching the target virtual key.

Steps S302, S304, S306, and S308 may be performed by a network device. In some embodiments, as shown in FIG. 2, when the network device includes the user equipment 102, steps S302, S304, S306, and S308 may be performed by the user equipment 102. In some embodiments, as shown in FIG. 1, when the network device includes the user equipment 102 and the server 112, S302, S306, and S308 may be performed by the user equipment 102, and S304 may be performed by the server 112.

In some embodiments, the foregoing object control method may be applied to, but is not limited to, the running process of the round of game. Triggering automatic adjustment of the key state of the target virtual key is controlled by using the target angle generated by the target object during execution of the target action, to simplify an adjustment operation, save the time of controlling the target object to perform the target operation matching the target virtual key, and improve the efficiency of object control. Using an example in which the foregoing game application is a racing game application, the target object participating in the round of game may be, but is not limited to, a virtual object controlled in the racing game application, for example, a virtual character, virtual equipment, or a virtual vehicle. This is not limited in this embodiment.

In this embodiment, triggering automatic adjustment of the key state of the target virtual key is controlled according to the detected target angle generated by the target object during execution of the target action, to simplify an adjustment operation on the key state of the target virtual key, thereby overcoming the problem of high operational complexity due to the need of a player to repeat manual operations multiple times to trigger adjustment of the key state in the related art. Further, while the adjustment operation is simplified, whether a touch operation is performed on the target virtual key of which the key state is the touch-enabled state can also be detected in time, to respond to the touch operation and control the target object to perform the target operation matching the target virtual key in time, thereby achieving the objective of improving the control efficiency of controlling the foregoing object to perform the target operation.

Figure 4:
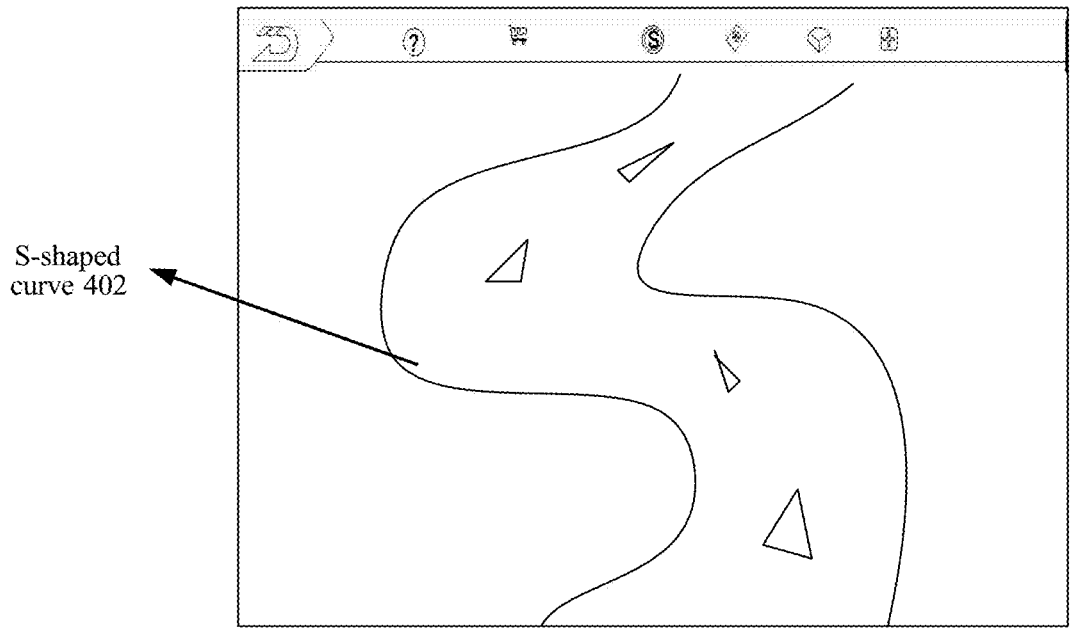
FIG. 4 is a schematic diagram of a curve according to an embodiment of this application.

In some embodiments, the target action may include, but is not limited to, an action or a combination of actions to be performed when a curve in a racing track is passed. For example, the curve may include, but is not limited to, an S-shaped curve, and the corresponding target action may include, but is not limited to, a two-direction drift action. For example, when an S-shaped curve 402 shown in FIG. 4 is provided in the racing track, the target action to be performed by the target object may include, but is not limited to, a sub-action of drifting to the left and a sub-action of drifting to the right. Correspondingly, the target angle may include, but is not limited to, a drift angle generated by performing the drift action, and the drift angle may be, but is not limited to, an angle carrying direction information. If it is assumed that the drift angle of drifting to the left is a positive angle, the drift angle of drifting to the right is a negative angle, and vice versa.

In some embodiments, the target virtual key may be, but is not limited to, a control key configured to control the target object to perform the target operation in a scene provided by the client, and the target operation may be used for, but not limited to, assisting the target object in completing the current round of game. That is, the target virtual key may be configured for, but not limited to, providing a game prop or a game skill for the target object that is running the round of game. Use of the game prop or the game skill being triggered may require, but not limited to, accumulation of a specific energy value. In a case that the energy value reaches a total value of the capacity of an energy bar, the game prop or the game skill is in a trigger-allowed state. The game prop or the game skill may include, but is not limited to, a prop or a skill for accelerating the target object, a prop or a skill for assisting acceleration of a teammate of the target object, a prop or a skill for obstructing an opponent of the target object, and the like. This is merely an example, and this embodiment is not limited thereto.

Correspondingly, in this embodiment, the key state of the target virtual key may include, but is not limited to, a touch-enabled state and a non-touch-enabled state. When the game prop or the game skill is in the trigger-allowed state, the key state of the target virtual key for control is also adjusted from the non-touch-enabled state to the touch-enabled state. That is, in this embodiment, the adjustment of the key state of the target virtual key from the non-touch-enabled state to the touch-enabled state is a changing process. In an interaction interface, a state presented by the target virtual key may change synchronously with the energy value of the energy bar, but this application is not limited thereto.

Figure 5:
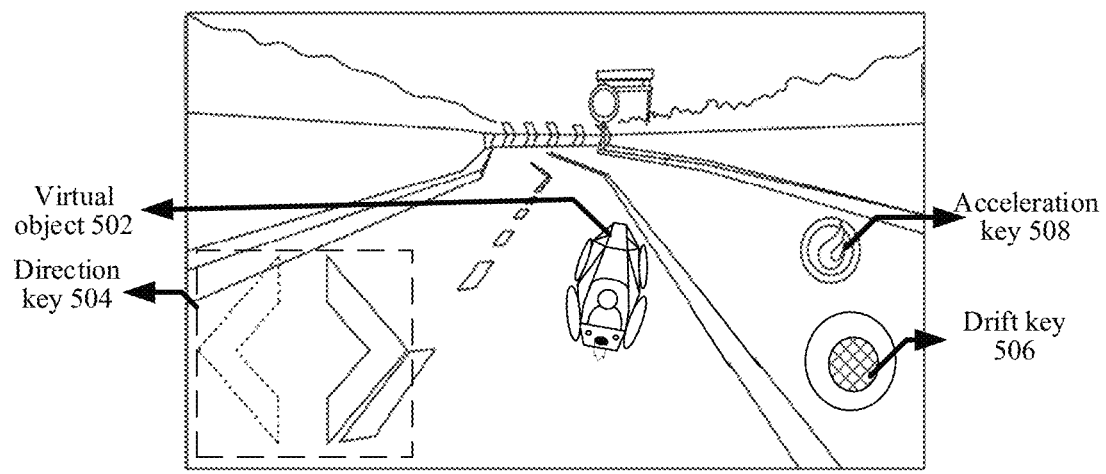
FIG. 5 is a schematic diagram of a game application according to an embodiment of this application.

For example, as shown in FIG. 5, assuming that the game application is a racing game application, the target object is a virtual object 502, and the virtual object 502 may be controlled to perform the drift action through a direction key 504 and a drift key 506. The target virtual key is an acceleration key 508.

Figure 6:
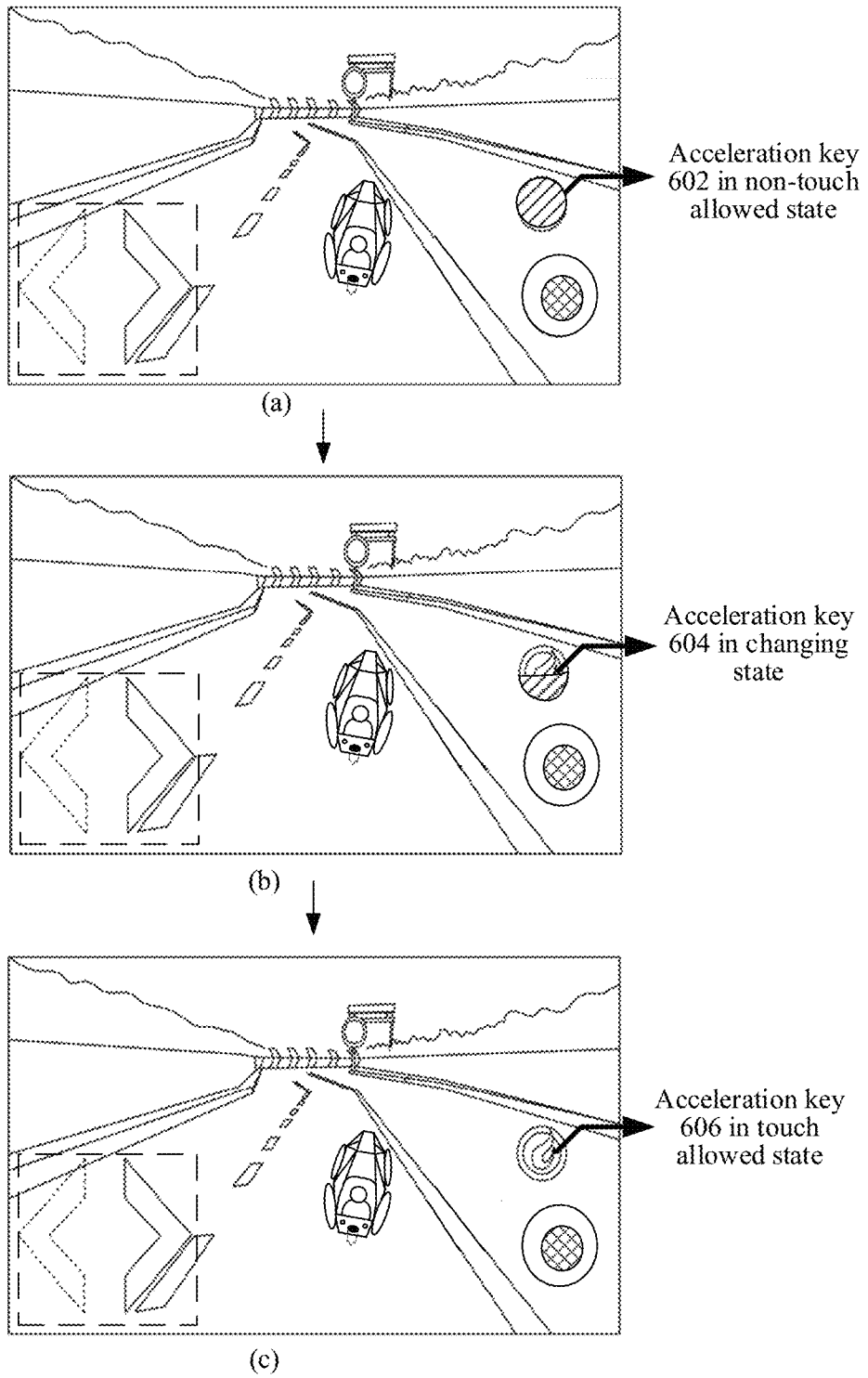
FIG. 6 is a schematic diagram of a key state change of a target virtual key according to an embodiment of this application.

In a running process of a round of game, in a process in which the virtual object 502 performs the target action, the key state of the corresponding target virtual key may be shown in FIG. 6: An initial state is presented as an acceleration key 602 in the non-touch-enabled state shown by (a) in FIG. 6 (as shown in the figure, a key identifier is not displayed at all). Then, when it is detected that the target angle generated by the target action reaches a trigger threshold, a state presented by the target virtual key may be adjusted to, but not limited to, an acceleration key 604 in a changing state shown by (b) in FIG. 6 (as shown in the figure, the key identifier is partially displayed). Finally, when it is determined that the target virtual key reaches the touch-enabled state (as shown in the figure, the key identifier is completely displayed), the acceleration key 606 in the touch-enabled state is presented as (c) in FIG. 6.

In some embodiments, when the target angle reaches the trigger threshold, the triggering adjustment of the key state of the target virtual key may include, but is not limited to:

1) increasing an energy value of an energy bar corresponding to a game prop controlled by the target virtual key by a first target value within a unit time; and
2) reducing a cool down time (CD) corresponding to the game prop controlled by the target virtual key by a first duration within a unit time.

That is, in this embodiment, the energy value and/or the CD in the energy bar associated with the key state of the target virtual key may, be adjusted according to, but not limited to, the target angle. Therefore, gradually adjusting the key state of the target virtual key from the non-touch-enabled state to the touch-enabled state is controlled according to the energy value and/or the CD, to achieve gradient control of the target virtual key.

Further, in this embodiment, a method for determining the first target value and a method for determining the first duration are not limited. For example, the first target value is determined according to a capacity of the energy bar, and the first duration is determined according to a total duration of the CD. That is, in this embodiment, the gradient control process is not affected by manual control of a player participating in the round of game, and is not limited by a time of manual operation or a controlled traveling speed any more, and instead, significant adjustment may be performed at a time, to reduce an adjustment time, improve the efficiency of state adjustment of the target virtual key, and further improve the control efficiency of controlling the target object to perform the target operation matching the target virtual key.

The first target value may be greater than or equal to ⅓ of the total value of the capacity of the energy bar, but this application is not limited thereto, and the first duration may be greater than or equal to ⅓ of the total duration of the CD, but this application is not limited thereto. That is, when the target action includes a first target sub-action and a second target sub-action, and the first target sub-action and the second target sub-action may also assist in adjusting the energy value or the duration, to improve the control efficiency, when the target angle reaches the trigger threshold, the energy value or the duration may be significantly adjusted at a time in a unit time, so that the duration of adjusting the key state of the target virtual key can be shortened, thereby improving the efficiency of touching the target virtual key to perform the target operation.

In some embodiments, the detecting a target angle generated by a target object controlled by a user of the terminal device during execution of a target action includes: detecting a target angle generated by the target object during execution of the first target sub-action according to a forward orientation as a first direction and execution of the second target sub-action according to a forward orientation as a second direction. For example, when it is detected that the target angle is less than or equal to 0, it is determined that the target angle reaches the trigger threshold.

In some embodiments, the controlling the target object to perform a target operation matching the target virtual key includes: controlling the target object to perform a release operation on a special skill matching the target virtual key, and adjusting the key state of the target virtual key to the non-touch-enabled state, the special skill being used for assisting the target object in completing the round of game. For example, the special skill may be, but is not limited to, a prop or a skill for accelerating the target object, a prop or a skill for assisting acceleration of a teammate of the target object, a prop or a skill for obstructing an opponent of the target object, and the like.

Figure 7:
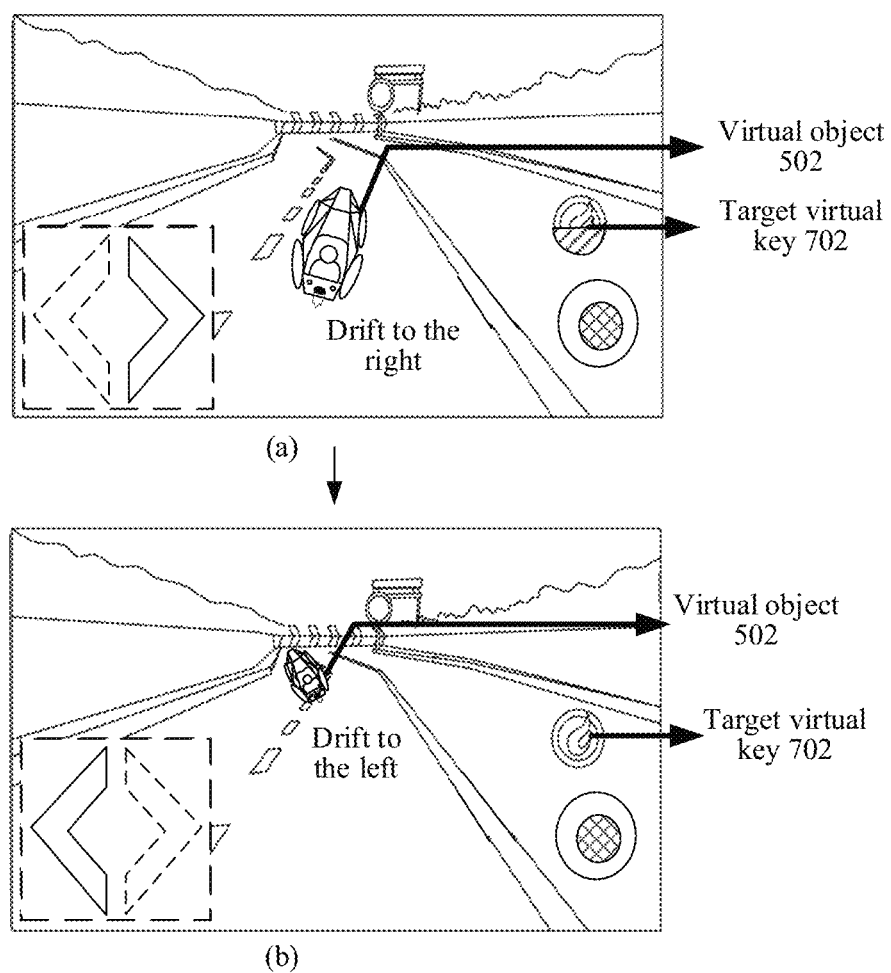
FIG. 7 is a schematic diagram of an optional object control method according to an embodiment of this application.
Figure 8:
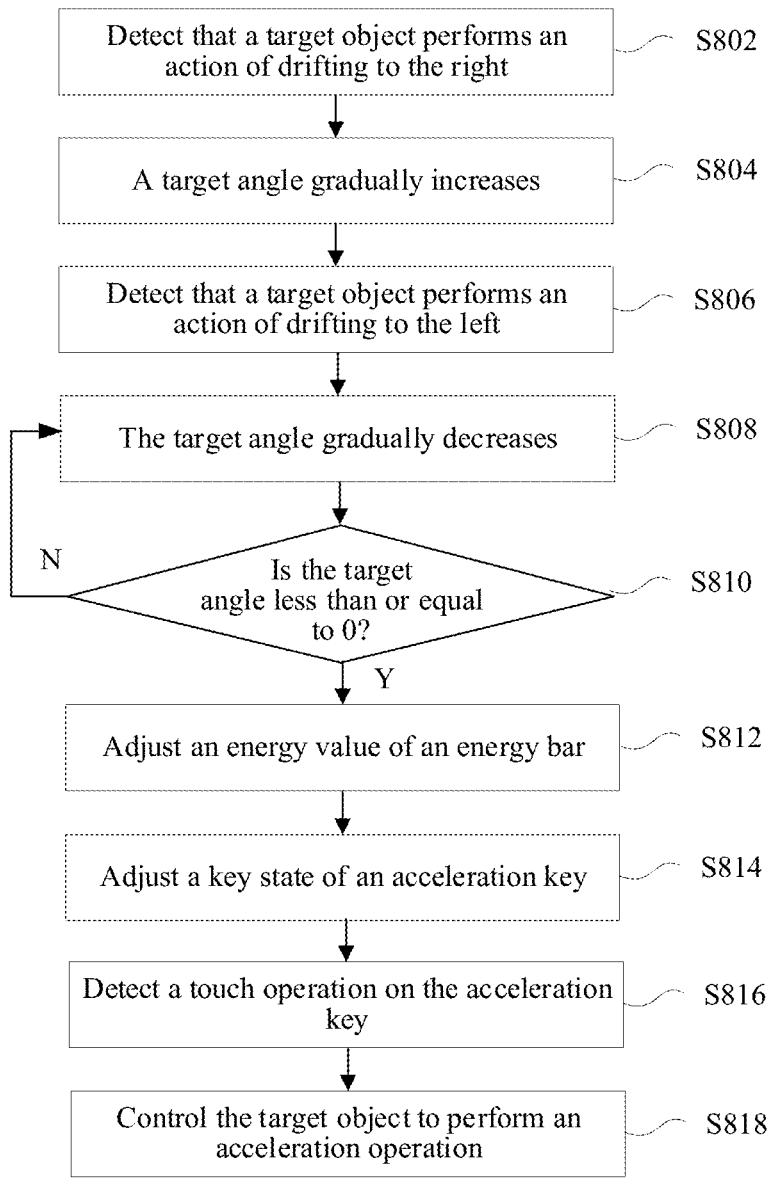
FIG. 8 is a flowchart of another optional object control method according to an embodiment of this application.

A detailed description is made with reference to the examples shown in FIG. 7 and FIG. 8: Assuming that a racing game application is still used as an example, in a running process of a round of game, it is detected that the target object (the virtual object 502 shown in the figure) controlled by the client performs the target action, for example, first drifting to the left and then drifting to the right respectively shown by (a) and (b) in FIG. 7. During execution of the target action, the generated target angle (a drift angle shown in the figure) is detected. In a case that the drift angle reaches the trigger threshold (for example, the drift angle is less than or equal to 0 degrees), adjustment of the key state of a target virtual key 702 (an acceleration key shown in the figure) is triggered. For example, an energy value of an energy bar corresponding to a game prop controlled by the target virtual key is increased at a time within a unit time, for example, by 30-40%. Further, as shown by (b) in FIG. 7, assuming that after the energy value is increased, the energy value of the energy bar reaches the total value of the capacity, the key state of the target virtual key 702 (an acceleration key shown in the figure) is adjusted to the touch-enabled state (as shown in the figure, the key identifier is displayed). A touch operation on the target virtual key (an acceleration key shown in the figure) may be detected, and the target object may be controlled to perform an acceleration operation in response to the touch operation.

Further, an execution logic flow of a control process shown in FIG. 7 may be shown as S802 to S818 in FIG. 8:

In a running process of a round of game, it is detected that the target object performs an action of drifting to the right, and the target angle gradually increases correspondingly. It is further detected that the target object performs an action of drifting to the left, and the target angle gradually decreases correspondingly. In a case that it is detected that the target angle is less than or equal to 0, one-time adjustment within a unit time is automatically triggered to increase an energy value of an energy bar corresponding to a game prop controlled by the target virtual key. Further, when the adjusted energy value reaches the total value of the capacity of the energy bar, the key state of the acceleration key is adjusted from the non-touch-enabled state to the touch-enabled state. A touch operation on the acceleration key is detected, and the target object is controlled to perform an acceleration operation in response to the touch operation.

The state presented by the target virtual key is not limited to that shown in FIG. 6 and FIG. 7. In this embodiment, when the key state of the target virtual key is the touch-enabled state, the key identifier of the target virtual key shown in the figure may also be directly presented, and the key identifier is not hidden or partially displayed any more. This is merely a presentation example, and this embodiment is not limited thereto.

Through the embodiments provided in this application, triggering automatic adjustment of the key state of the target virtual key is controlled according to the detected target angle generated by the target object during execution of the target action, to simplify an adjustment operation on the key state of the target virtual key, thereby simplifying the operation of controlling the target object, and further overcoming the problem of high operational complexity due to the need of a player to repeat manual operations multiple times to trigger adjustment of the key state in the related art. Further, while the object control operation is simplified, whether a touch operation is performed on the target virtual key of which the key state is the touch-enabled state can also be detected in time, to control the target object to perform the target operation matching the target virtual key in time, thereby achieving the objective of improving the control efficiency of controlling the foregoing object to perform the target operation.

In an optional solution, the triggering adjustment of a key state of a target virtual key when the target angle reaches a trigger threshold includes the following steps:

S1. Increase, when the target angle reaches the trigger threshold, an energy value of an energy bar corresponding to a game prop controlled by the target virtual key by a first target value within a unit time to obtain an accumulated energy value.

S2. Adjust, when the accumulated energy value reaches a preset energy threshold, the key state of the target virtual key from a non-touch-enabled state to the touch-enabled state.

In the embodiments of this application, a method for determining the first target value is not limited. In some embodiments, the first target value is determined according to the capacity of the energy bar. For example, the first target value may be greater than or equal to ⅓ of the total value of the capacity of the energy bar.

In the embodiments of this application, a method for determining a preset energy threshold is not limited. In some embodiments, the preset energy threshold may be determined according to the total value of the capacity of the energy bar. For example, the preset energy threshold may be the total value of the capacity of the energy bar, or may be a preset multiple of the total value of the capacity of the energy bar (for example, 80%).

In some embodiments, after the increasing an energy value of an energy bar corresponding to a game prop controlled by the target virtual key by a first target value within a unit time to obtain an accumulated energy value, this embodiment further includes: keeping, when the accumulated energy value does not reach the preset energy threshold, the key state of the target virtual key being the non-touch-enabled state, and continuously detecting the energy value of the energy bar.

In some embodiments, when the target angle reaches the trigger threshold, the energy value of the energy bar corresponding to the game prop controlled by the target virtual key is increased by the first target value at a time within a unit time, and the first target value may be greater than or equal to ⅓ of the total value of the capacity of the energy bar, but this application is not limited thereto. Therefore, the time of adjusting the key state of the target virtual key is reduced, thereby further improving the control efficiency of controlling the target object to perform the target operation through the target virtual key.

The target action may include, but is not limited to, a first target sub-action performed by controlling the target object according to the forward orientation as a first direction, and a second target sub-action performed by controlling the target object according to the forward orientation as a second direction. After the first target sub-action and the second target sub-action are completed, the energy value of the energy bar may also be synchronously adjusted, but this application is not limited thereto. To accumulate an enough energy value in the energy bar as soon as possible after the target object completes the first target sub-action and the second target sub-action included in the target action, during execution of the first target sub-action and the second target sub-action, in a critical case that the target angle reaches the trigger threshold, the first target value corresponding to an adjustment amplitude of the energy value is set to be greater than or equal to ⅓ of the total value of the capacity of the energy bar, so that after the target object completes the target action, the energy value of the energy bar may reach the total value of the capacity as soon as possible, and the key state of the target virtual key may be adjusted to the touch-enabled state as soon as possible.

Figure 9:
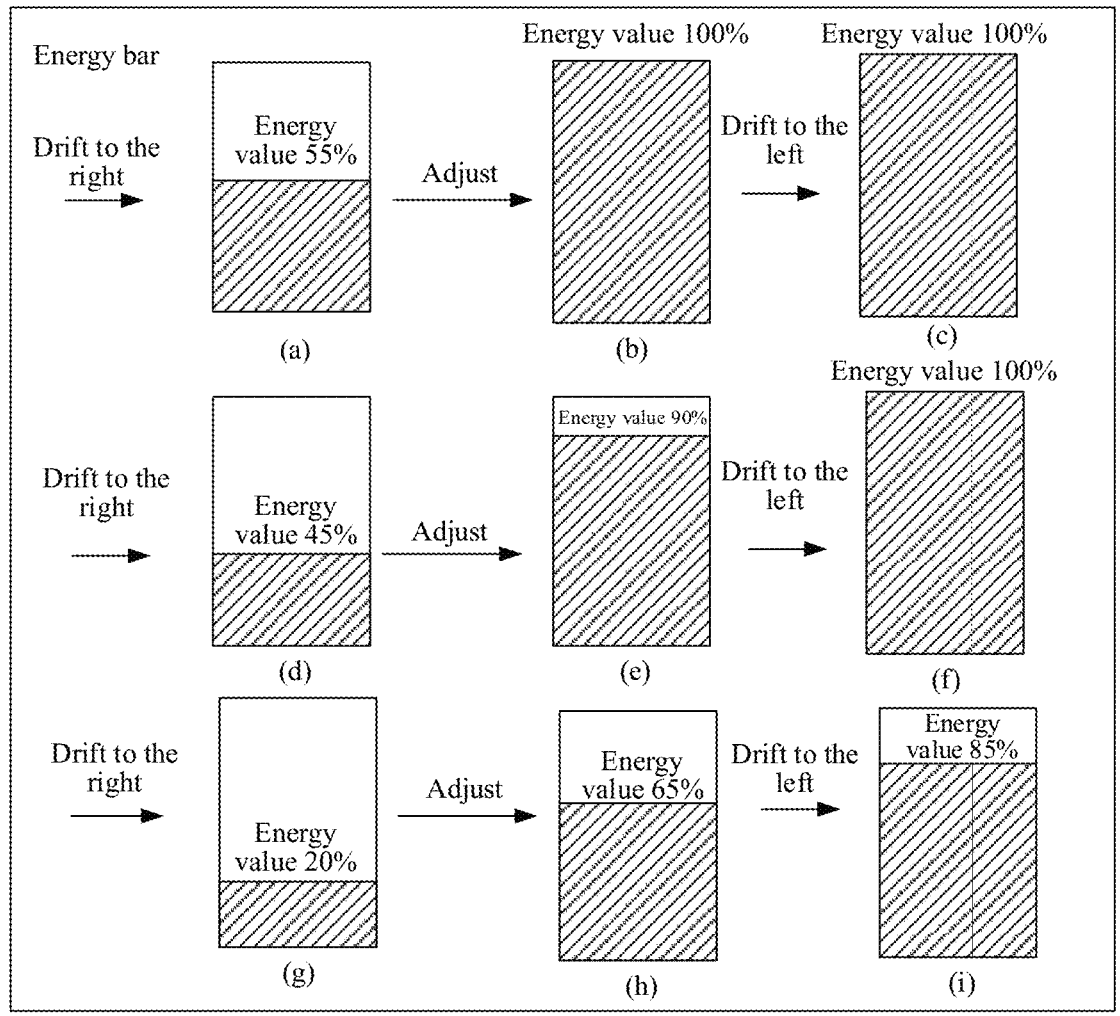
FIG. 9 is a schematic diagram of an energy value change in an energy bar according to an embodiment of this application.

A detailed description is made with reference to the example shown in FIG. 9: It is assumed that it is detected that the target object performs the target action, for example, first drifting to the right and then drifting to the left. In this process, detecting the generated target angle (for example, the drift angle) includes the following situations:

1) After the action of drifting to the right is performed, the energy value of the energy bar corresponding to the game prop controlled by the target virtual key is accumulated to 55%, as shown by (a) in FIG. 9. In the process in which the target object performs the action of drifting to the right, a control instruction for controlling the target object to perform the action of drifting to the left is detected, and the target angle generated in the process of drifting to the left is detected. When it is detected that the target angle reaches the trigger threshold, the energy value is adjusted to increase according to the first target value at a time within a unit time. Assuming that the first target value is 45%, the adjusted energy value of the energy bar is 100%, as shown by (b) in FIG. 9. Further, after the target object completes the action of drifting to the left, it is detected that the energy value of the energy bar is not changed any more, as shown by (c) in FIG. 9.

2) After the action of drifting to the right is performed, the energy value of the energy bar corresponding to the game prop controlled by the target virtual key is accumulated to 45%, as shown by (d) in FIG. 9. In the process in which the target object performs the action of drifting to the right, a control instruction for controlling the target object to perform the action of drifting to the left is detected, and the target angle generated in the process of drifting to the left is detected. When it is detected that the target angle reaches the trigger threshold, the energy value is adjusted to increase according to the first target value at a time within a unit time. Assuming that the first target value is 45%, the adjusted energy value of the energy bar is 90%, as shown by (e) in FIG. 9. Further, after the target object completes the action of drifting to the left, it is further detected that the energy value of the energy bar continues to accumulate and is not changed any more after reaching 100%, as shown by (0 in FIG. 9.

3) After the action of drifting to the right is performed, the energy value of the energy bar corresponding to the game prop controlled by the target virtual key is accumulated to 20%, as shown by (g) in FIG. 9. In the process in which the target object performs the action of drifting to the right, a control instruction for controlling the target object to perform the action of drifting to the left is detected, and the target angle generated in the process of drifting to the left is detected. When it is detected that the target angle reaches the trigger threshold, the energy value is adjusted to increase according to the first target value at a time within a unit time. Assuming that the first target value is 45%, the adjusted energy value of the energy bar is 65%, as shown by (h) in FIG. 9. Further, after the target object completes the action of drifting to the left, it is further detected that the energy value of the energy bar continues to accumulate, and it is assumed that the energy value reaches 85%, as shown by (f) in FIG. 9.

That is, in the cases of 1) and 2), after the target object completes the target action, the energy value of the energy bar directly reaches the total value of the capacity of the energy bar, and the key state of the target virtual key may be adjusted from the non-touch-enabled state to the touch-enabled state. However, in the case of 3), after the target object completes the target action, the energy value of the energy bar does not reach the total value of the capacity of the energy bar, but only reaches 85%, and the key state of the target virtual key needs to be kept in the non-touch-enabled state, and the energy value of the energy bar is continuously detected. That is, after the case of 3), it is necessary to further accumulate the energy value of energy operation through another operation.

The identifiers (a)-(i) shown in FIG. 9 are used for distinguishing the energy values of the energy bars, and the identifiers in different rows are not used for limiting an appearance order.

Through the embodiments provided in this application, when the target angle reaches the trigger threshold, an energy value of an energy bar corresponding to a game prop controlled by the target virtual key is increased by a first target value within a unit time to obtain an accumulated energy value, to control the adjustment of the key state of the target virtual key according to the adjustment of the energy value. Therefore, while the adjustment operation on the key state is simplified, the control efficiency of controlling the target object to perform the target operation by touching the target virtual key is improved.

In an optional solution, the detecting a target angle generated by a target object controlled by a user of the terminal device during execution of a target action includes the following steps:

S1. Obtain a first operation instruction generated by performing a touch and hold operation on a first virtual key and a second virtual key in a man-machine interaction interface presented on the client, the first virtual key being configured to adjust the forward orientation of the target object, and the second virtual key being configured to trigger the target object to perform the target action.

S2. Control, in response to the first operation instruction, the target object to perform the target action, the target action including: a first target sub-action performed by controlling the target object according to the forward orientation as a first direction, and a second target sub-action performed by controlling the target object according to the forward orientation as a second direction.

S3. Detect the target angle generated by the target object during execution of the first target sub-action and the second target sub-action.

The first virtual key may be, but is not limited to, a direction key, and the second virtual key may be, but is not limited to, a drift key that triggers a drift action. When a touch and hold operation is performed simultaneously on the first virtual key and the second virtual key, the first operation instruction is generated. The first operation instruction is used for instructing the target object to perform a drift action in a corresponding direction, for example, the action of drifting to the left and the action of drifting to the right.

A detailed description is made with reference to the example shown in FIG. 5: Assuming that a racing game application is still used as an example, in a running process of a round of game, it is detected that the target object (the virtual object 502 shown in the figure) controlled by the client performs the drift action. The target virtual key is the acceleration key 508. The virtual object 502 may be controlled, by using the direction key 504 and the drift key 506, to perform the drift action. The direction key 504 includes a left direction key and a right direction key. Correspondingly, the target action may include: a first target sub-action performed in a first direction, for example, the drift action of drifting to the right shown by (a) in FIG. 7, and a second target sub-action performed in a second direction, for example, the drift action of drifting to the left shown by (b) in FIG. 7.

Figure 10:
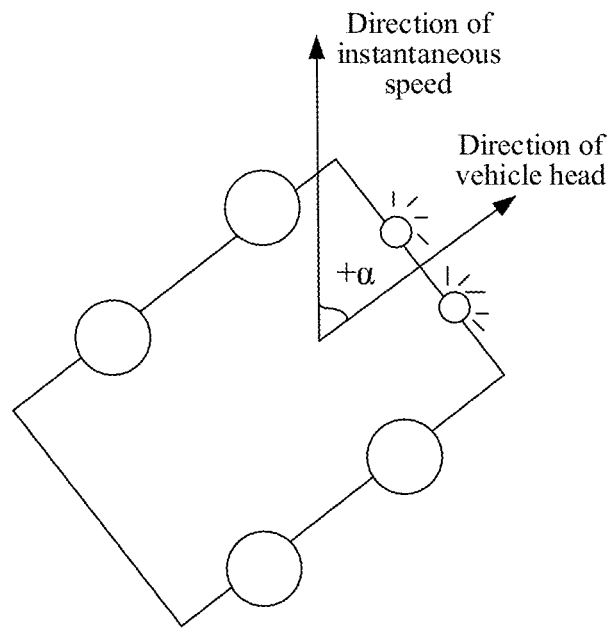
FIG. 10 is a schematic diagram of a target angle according to an embodiment of this application.
Figure 11:
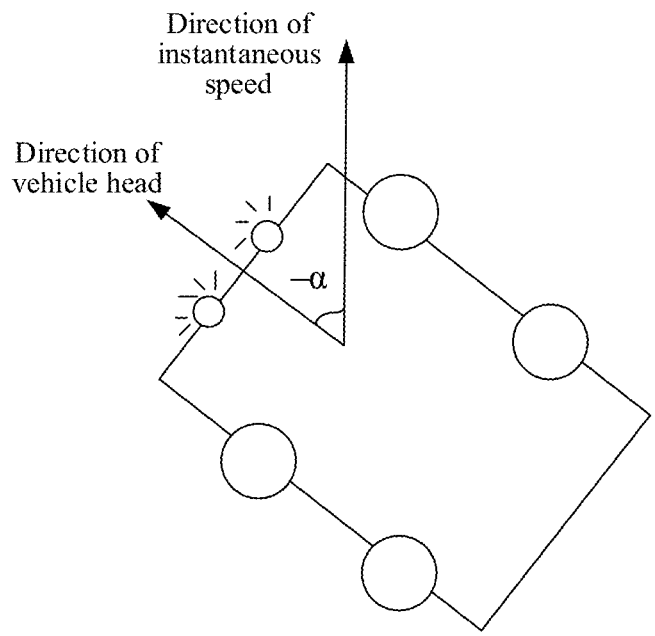
FIG. 11 is a schematic diagram of another target angle according to an embodiment of this application.

Further, as shown in FIG. 7, the target angle generated by the target object is detected during execution of the first target sub-action and the second target sub-action. It is assumed that it is detected that a drift angle generated by the target object during execution of the first target sub-action (for example, the action of drifting to the right shown by (a) in FIG. 7) is a positive angle, where as shown in FIG. 10, the drift angle is an included angle +α between a forward orientation (such as a direction of the vehicle head of the virtual vehicle) and a sliding direction (such as a direction of an instantaneous speed of the virtual vehicle) of the target object, and a drift angle generated by the target object during execution of the second target sub-action (for example, the action of drifting to the left shown by (b) in FIG. 7) is a negative angle, where as shown in FIG. 11, the drift angle is an included angle −α between a forward orientation (such as the direction of the vehicle head of the virtual vehicle) and a sliding direction (such as the direction of the instantaneous speed of the virtual vehicle) of the target object. In this process, when it is detected that the drift angle reaches a critical case of being less than or equal to 0, one-time adjustment within a unit time is triggered to increase the energy value of the energy bar, so that the adjustment of the key state of the target virtual key can be controlled according to the energy value.

In some embodiments, during the detecting a target angle generated by a target object controlled by a user of the terminal device during execution of a target action, the method further includes the following steps:

S31. Obtain, during controlling the target object to perform the first target sub-action, a first action parameter value corresponding to the first target sub-action.

S32. Increase, according to a second target value matching the first action parameter value, an energy value of an energy bar corresponding to a game prop controlled by the target virtual key, the second target value being an energy value added in the energy bar within a unit time during execution of the first target sub-action.

S33. Obtain, during controlling the target object to perform the second target sub-action, a second action parameter value corresponding to the second target sub-action.

S34. Increase, according to a third target value matching the second action parameter value, an energy value of an energy bar corresponding to a game prop controlled by the target virtual key, the third target value being an energy value added in the energy bar within a unit time during execution of the second target sub-action.

In this embodiment, for the first target sub-action and the second target sub-action, during the execution, the adjustment of the energy value of the energy bar may also be triggered, but this application is not limited thereto. That is, when a single drift action is performed, the adjustment of the energy value may also be triggered, and in a process of switching between the two drift actions, the adjustment may further be triggered automatically according to the target angle.

In addition, in this embodiment, the action parameters corresponding to the target sub-actions may include, but are not limited to, a traveling speed and an action duration of the target object. For example, when the target object performs the drift action, the higher the traveling speed and the longer the drift time, the greater the corresponding increase in the energy bar. That is, the change of the energy value is positively correlated with the action parameters. In this process, the energy value (such as the second target value and the third target value) increased within a unit time is less than the first target value adjusted according to the target angle.

Through the embodiments provided in this application, the adjustment of increasing the energy value by the first target value is controlled by detecting the target angle generated by the target object during execution of the first target sub-action and the second target sub-action. In addition, during the execution of the first target sub-action and the execution of the second target sub-action, the energy value may also be increased by the second target value and the third target value, so that after the target object completes the target action, the energy value of the energy bar may be accumulated to the total value of the capacity in time to reduce the time of adjusting the key state of the target virtual key, so that the target virtual key can be adjusted to the touch-enabled state as soon as possible, thereby improving the control efficiency of controlling the target object to perform the target operation.

In an optional solution, before the triggering adjustment of a key state of a target virtual key, the method further includes:

detecting the target angle generated by the target object during switching from the first target sub-action to the second target sub-action; and determining, when it is detected that the target angle is less than or equal to 0, that the target angle reaches the trigger threshold.

In the embodiments of this application, adjustment of the key state of the target virtual key may alternatively be triggered according to the target angle generated by the target object during switching from the first target sub-action to the second target sub-action. Specifically, in a process in which the target object switches from performing the first target sub-action according to a forward orientation as a first direction to performing the second target sub-action according to a forward orientation as a second direction, a target angle generated in the action switching process may be detected in real time, so that when it is determined that the detected target angle is less than or equal to 0, it is determined that the target angle reaches the trigger threshold, and one-time significant adjustment of the energy value is implemented within a unit time, so that the duration of adjusting the key state of the target virtual key can be shortened, thereby improving the efficiency of touching the target virtual key to perform the target operation.

In an optional solution, the controlling the target object to perform a target operation matching the target virtual key includes the following steps:

S1. Control the target object to perform a release operation on a special skill matching the target virtual key, and adjusting the key state of the target virtual key to the non-touch-enabled state, the special skill being used for assisting the target object in completing the round of game.

In some embodiments, the controlling the target object to perform a release operation on a special skill matching the target virtual key includes: controlling the target object to perform an acceleration operation matching the target virtual key.

Figure 12:
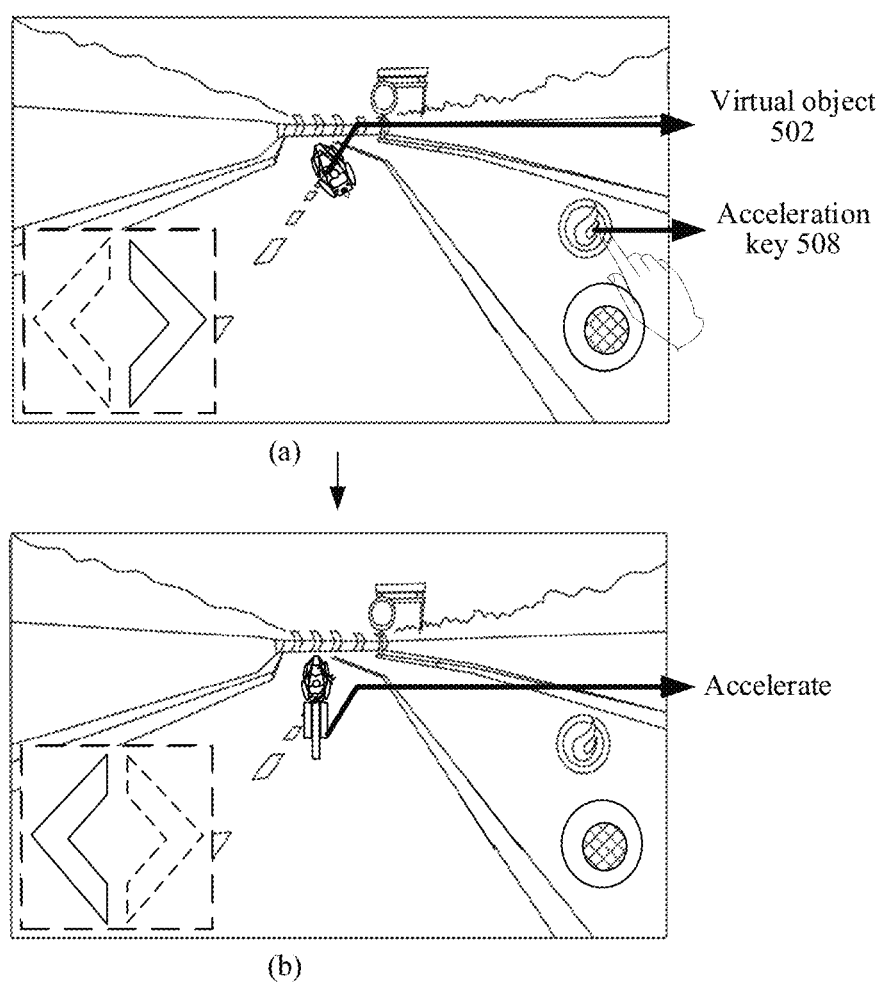
FIG. 12 is a schematic diagram of performing a target operation according to an embodiment of this application.

A detailed description is made with reference to the example shown in FIG. 12. Assuming that the game application is a racing game application, the target object is the virtual object 502, and the target virtual key is the acceleration key 508. As shown by (a) in FIG. 12, after the touch operation performed on the target virtual key is detected, the virtual object 502 is controlled to start to perform the acceleration operation, as shown by (b) in FIG. 12. Further, after the acceleration operation is completed, the acceleration key 508 is restored to the non-touch-enabled state (not shown in the figure).

Through the embodiments provided in this application, the target object is controlled to perform the release operation on the special skill matching the target virtual key in response to the touch operation on the target virtual key, and the key state of the target virtual key is restored to the non-touch-enabled state, so that the control of the target virtual key can be triggered next time by using the foregoing method.

For ease of description, the foregoing method embodiments are stated as a series of action combinations. However, a person skilled in the art is to learn that this application is not limited to the described action sequence, because according to this application, some steps may be performed in another sequence or simultaneously. In addition, a person skilled in the art is also to understand that the embodiments described in this specification are all exemplary embodiments, and the involved actions and modules are not necessarily required to this application.

According to another aspect of the embodiments of this application, an object control apparatus for implementing the foregoing object control method is further provided. The object control apparatus provided in the embodiments of this application is an apparatus corresponding to the foregoing object control method. For briefness, technical details of the object control apparatus are not described herein again. For technical details of the object control apparatus, refer to the relevant content in the object control method above.

Figure 13:
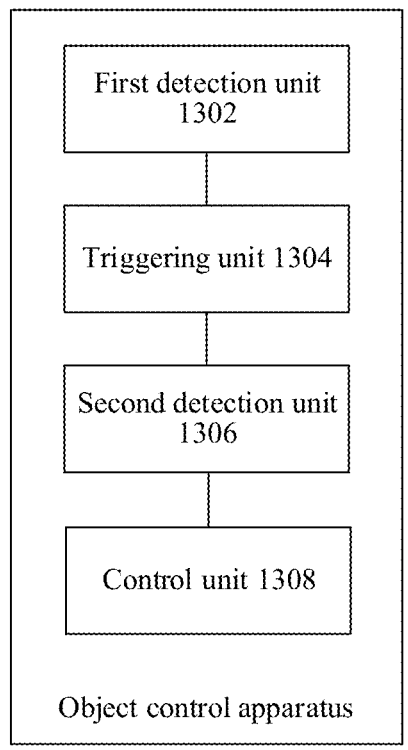
FIG. 13 is a schematic structural diagram of an optional object control apparatus according to an embodiment of this application.

As shown in FIG. 13, the apparatus includes:

1) a first detection unit 1302, configured to detect, in a running process of a round of game, a target angle generated by a target object controlled by a user of the terminal device during execution of a target action, the target angle being an included angle between a forward orientation of the target object and a sliding direction of the target object;
2) a triggering unit 1304, configured to automatically trigger adjustment of a key state of a target virtual key when the target angle reaches a trigger threshold;
3) a second detection unit 1306, configured to detect, when the key state of the target virtual key is a touch-enabled state, a touch operation performed on the target virtual key; and
4) a control unit 1308, configured to control, in response to the touch operation, the target object to perform a target operation matching the target virtual key.

In an optional solution, the triggering unit 1304 includes:
a first increasing module, configured to automatically increase, when the target angle reaches the trigger threshold, an energy value of an energy bar corresponding to a game prop controlled by the target virtual key by a first target value within a unit time to obtain an accumulated energy value, the first target value being determined according to a capacity of the energy bar; and
an adjustment module, configured to adjust, when the accumulated energy value reaches a preset energy threshold, the key state of the target virtual key from a non-touch-enabled state to the touch-enabled state.

In an optional solution, the apparatus further includes:
a processing module, configured to keep, after the increasing an energy value of an energy bar corresponding to a game prop controlled by the target virtual key by a first target value within a unit time to obtain an accumulated energy value, the key state of the target virtual key being the non-touch-enabled state when the accumulated energy value does not reach a total value of the capacity of the energy bar, and continuously detect the energy value of the energy bar.

In an optional solution, the first detection unit 1302 includes:

1) a first obtaining module, configured to obtain a first operation instruction generated by performing a touch and hold operation on a first virtual key and a second virtual key in a man-machine interaction interface presented on the client, the first virtual key being configured to adjust the forward orientation of the target object, and the second virtual key being configured to trigger the target object to perform the target action;
2) a first control module, configured to control, in response to the first operation instruction, the target object to perform the target action, the target action including: a first target sub-action performed by controlling the target object according to the forward orientation as a first direction, and a second target sub-action performed by controlling the target object according to the forward orientation as a second direction; and
3) a first increasing module, configured to detect the target angle generated by the target object during execution of the first target sub-action and the second target sub-action.

In some embodiments, the apparatus further includes:
3) a second obtaining module, configured to obtain, during controlling the target object to perform the first target sub-action, during the detecting a target angle generated by a target object controlled by a user of the terminal device during execution of a target action, a first action parameter value corresponding to the first target sub-action;
4) a second increasing module, configured to increase, according to a second target value matching the first action parameter value, an energy value of an energy bar corresponding to a game prop controlled by the target virtual key, the second target value being an energy value added in the energy bar within a unit time during execution of the first target sub-action;
5) a third obtaining module, configured to obtain, during controlling the target object to perform the second target sub-action, a second action parameter value corresponding to the second target sub-action; and
6) a third increasing module, configured to increase, according to a third target value matching the second action parameter value, an energy value of an energy bar corresponding to a game prop controlled by the target virtual key, the third target value being an energy value added in the energy bar within a unit time during execution of the second target sub-action.

In an optional solution, the apparatus further includes:
a third detection unit, configured to detect, before the triggering adjustment of a key state of a target virtual key, the target angle generated by the target object during switching from the first target sub-action to the second target sub-action; and
a determining unit, configured to determine, when it is detected that the target angle is less than or equal to 0, that the target angle reaches the trigger threshold.

In an optional solution, the control unit 1308 includes:
1) a control module, configured to control the target object to perform a release operation on a special skill matching the target virtual key, and adjust the key state of the target virtual key to the non-touch-enabled state, the special skill being used for assisting the target object in completing the round of game.

In some embodiments, in this embodiment, the control module includes: a control submodule, configured to control the target object to perform an acceleration operation matching the target virtual key.

Figure 14:
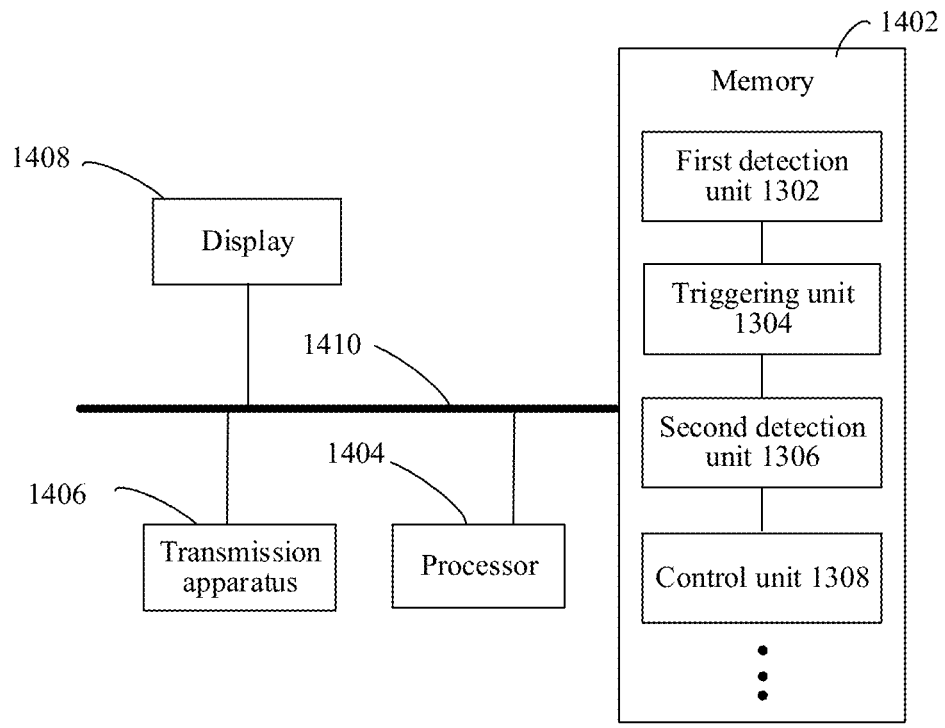
FIG. 14 is a schematic structural diagram of an optional electronic device according to an embodiment of this application.

According to still another aspect of the embodiments of this application, an electronic device for implementing the above object control method is further provided. As shown in FIG. 14, the electronic device includes a memory 1402 and a processor 1404. The memory 1402 stores a computer program, and the processor 1404 is configured to perform the operations in any one of the above method embodiments by using the computer program.

In some embodiments, the electronic device may be located in at least one of a plurality of network devices located in a computer network.

In some embodiments, the processor may be configured to perform the following steps through a computer program:
S1. Detect, in a running process of a round of game, a target angle generated by a target object controlled by a user of the terminal device during execution of a target action, the target angle being an included angle between a forward orientation of the target object and a sliding direction of the target object.
S2. Automatically trigger adjustment of a key state of a target virtual key when the target angle reaches a trigger threshold.
S3. Detect, when the key state of the target virtual key is a touch-enabled state, a touch operation performed on the target virtual key.
S4. Control, in response to the touch operation, the target object to perform a target operation matching the target virtual key.

In some embodiments, a person of ordinary skill in the art may understand that, the structure shown in FIG. 14 is merely for illustration. The electronic device may also be a terminal device such as a smartphone (such as an Android mobile phone or an iOS mobile phone), a tablet computer, a palmtop computer, a mobile Internet device (MID), or a PAD. FIG. 14 does not constitute a limitation on the structure of the foregoing electronic device. For example, the electronic device may further include more or fewer components (such as a network interface, and the like) than those shown in FIG. 14, or have configuration different from that shown in FIG. 14.

The memory 1402 may be configured to store a software program and a module, for example, a program instruction/module corresponding to the object control method and apparatus in the embodiments of this application, and the processor 1404 performs various functional applications and data processing by running a software program and a module stored in the memory 1402, that is, implementing the foregoing object control method. The memory 1402 may include a high-speed RAM, and may further include a non-volatile memory, for example, one or more magnetic storage apparatuses, flash memories, or other non-volatile solid-state memories. In some examples, the memory 1402 may further include memories remotely disposed relative to the processor 1404, and the remote memories may be connected to a terminal through a network. The foregoing examples of the network include, but are not limited to, the Internet, an intranet, a local area network, a mobile communication network, and a combination thereof. The memory 1402 may be specifically configured to store information such as related control information or operation instructions of the target object, but this application is not limited thereto. As an example, as shown in FIG. 14, the memory 1402 may, but is not limited to, include a first detection unit 1302, a triggering unit 1304, a second detection unit 1306, and a control unit 1308 in the object control apparatus. In addition, the memory 1402 may also include, but is not limited to, another module or unit in the object control apparatus, which is not described in this example.

In some embodiments, a transmission apparatus 1406 is configured to receive or transmit data through a network. Specific examples of the network may include a wired network and a wireless network. In an example, the transmission apparatus 1406 includes a network interface controller (NIC). The NIC may be connected to another network device and a router by using a network cable, so as to communicate with the Internet or a local area network. In an example, the transmission apparatus 1406 is a radio frequency (RF) module, which communicates with the Internet in a wireless manner.

In addition, the electronic device further includes: a display 1408, configured to display the target object and the target action and the target operation performed by the target object; and a connection bus 1410, configured to connect various module components in the electronic device.

According to still another aspect of the embodiments of this application, a storage medium is further provided. The storage medium stores a computer program, the computer program being set to perform steps in any one of the foregoing method embodiments when run.

In some embodiments, the storage medium may be set to store a computer program for performing the following:
S1. Detect, in a running process of a round of game, a target angle generated by a target object controlled by a user of the terminal device during execution of a target action, the target angle being an included angle between a forward orientation of the target object and a sliding direction of the target object.
S2. Automatically trigger adjustment of a key state of a target virtual key when the target angle reaches a trigger threshold.
S3. Detect, when the key state of the target virtual key is a touch-enabled state, a touch operation performed on the target virtual key.
S4. Control, in response to the touch operation, the target object to perform a target operation matching the target virtual key.

According to an aspect of the embodiments of this application, a computer program product including instructions is further provided, the computer program product, when run on a computer, causing the computer to perform the steps according to any one of the foregoing method embodiments.

In some embodiments, a person of ordinary skill in the art may understand that all or some of the steps of the methods in the foregoing embodiments may be implemented by a program indicating relevant hardware of the terminal device. The program may be stored in a computer-readable storage medium. The storage medium may include a flash disk, a read-only memory (ROM), a random access memory (RAM), a magnetic disk, an optical disc, and the like.

The sequence numbers of the foregoing embodiments of this application are merely for description purposes, and are not intended to indicate the preference among the embodiments.

In a case that the integrated unit in the foregoing embodiments is implemented in the form of a software function unit and sold or used as an independent product, the integrated unit may be stored in the foregoing computer-readable storage medium. Based on such understanding, the technical solutions of this application essentially, or some contributing to the related art, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, the descriptions of the embodiments have respective focuses. For a part that is not described in detail in an embodiment, refer to related descriptions in other embodiments.

In the several embodiments provided in this application, it is to be understood that the disclosed client may be implemented in other manners. The described apparatus embodiments are merely exemplary. For example, the unit division is merely logical function division, and may use other division manners during actual implementation. For example, a plurality of units or components may be combined or integrated into another system, or some features may be omitted or not performed. In addition, the coupling, or direct coupling, or communication connection between the displayed or discussed components may be the indirect coupling or communication connection through some interfaces, units, or modules, and may be in electrical or other forms.

The units described as separate parts may or may not be physically separated, and the components displayed as units may or may not be physical units, and may be located in one place or may be distributed over a plurality of network units. Some or all of the units may be selected according to actual requirements to achieve the objectives of the solutions in the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

The foregoing descriptions are exemplary implementations of this application. A person of ordinary skill in the art may make several improvements and refinements without departing from the principle of this application, and the improvements and refinements shall fall within the protection scope of this application.

What is claimed is:

1. An object control method, applicable to a terminal device, the method comprising:
    detecting, in a running process of a round of game, a target angle generated by a target object controlled by a user of the terminal device during execution of a target action, the target angle being an included angle between a forward orientation of the target object and a sliding direction of the target object;
    triggering adjustment of a key state of a target virtual key when the target angle reaches a trigger threshold;
    detecting, when the key state of the target virtual key is a touch-enabled state, a touch operation performed on the target virtual key; and
    controlling, in response to the touch operation, the target object to perform a target operation matching the target virtual key.

2. The method according to claim 1, wherein the triggering adjustment of a key state of a target virtual key when the target angle reaches a trigger threshold comprises:
    increasing, when the target angle reaches the trigger threshold, an energy value of an energy bar corresponding to a game prop controlled by the target virtual key by a first target value within a unit time to obtain an accumulated energy value; and
    adjusting, when the accumulated energy value reaches a preset energy threshold, the key state of the target virtual key from a non-touch-enabled state to the touch-enabled state.

3. The method according to claim 2, further comprising:
    after increasing an energy value of an energy bar corresponding to a game prop controlled by the target virtual key by a first target value within a unit time to obtain an accumulated energy value:
    keeping, when the accumulated energy value does not reach the preset energy threshold, the key state of the target virtual key being the non-touch-enabled state, and continuously detecting the energy value of the energy bar.

4. The method according to claim 1, wherein the detecting a target angle generated by a target object controlled by a user of the terminal device during execution of a target action comprises:
    obtaining a first operation instruction generated by performing a touch and hold operation on a first virtual key and a second virtual key in a man-machine interaction interface presented on the client, the first virtual key being configured to adjust the forward orientation of the target object, and the second virtual key being configured to trigger the target object to perform the target action;
    controlling, in response to the first operation instruction, the target object to perform the target action, the target action comprising: a first target sub-action performed by controlling the target object according to the forward orientation as a first direction, and a second target sub-action performed by controlling the target object according to the forward orientation as a second direction; and
    detecting the target angle generated by the target object during execution of the first target sub-action and the second target sub-action.

5. The method according to claim 4, further comprising:
    during the detecting a target angle generated by a target object controlled by a user of the terminal device during execution of a target action:
    obtaining, during controlling the target object to perform the first target sub-action, a first action parameter value corresponding to the first target sub-action;
    increasing, according to a second target value matching the first action parameter value, an energy value of an energy bar corresponding to a game prop controlled by the target virtual key, the second target value being an energy value added in the energy bar within a unit time during execution of the first target sub-action;

obtaining, during controlling the target object to perform the second target sub-action, a second action parameter value corresponding to the second target sub-action; and increasing, according to a third target value matching the second action parameter value, an energy value of an energy bar corresponding to a game prop controlled by the target virtual key, the third target value being an energy value added in the energy bar within a unit time during execution of the second target sub-action.

6. The method according to claim 4, further comprising: before the triggering adjustment of a key state of a target virtual key:

detecting the target angle generated by the target object during switching from the first target sub-action to the second target sub-action; and determining, when it is detected that the target angle is less than or equal to 0, that the target angle reaches the trigger threshold.

7. The method according to claim 1, wherein the controlling the target object to perform a target operation matching the target virtual key comprises:

controlling the target object to perform a release operation on a special skill matching the target virtual key, and adjusting the key state of the target virtual key to the non-touch-enabled state, the special skill being used for assisting the target object in completing the round of game.

8. The method according to claim 7, wherein the controlling the target object to perform a release operation on a special skill matching the target virtual key comprises:

controlling the target object to perform an acceleration operation matching the target virtual key.

9. A terminal device, comprising a memory and a processor, the memory storing a plurality of computer programs that, when executed by the processor, cause the terminal device to perform a plurality of operations including:

detecting, in a running process of a round of game, a target angle generated by a target object controlled by a user of the terminal device during execution of a target action, the target angle being an included angle between a forward orientation of the target object and a sliding direction of the target object;

triggering adjustment of a key state of a target virtual key when the target angle reaches a trigger threshold;

detecting, when the key state of the target virtual key is a touch-enabled state, a touch operation performed on the target virtual key; and controlling, in response to the touch operation, the target object to perform a target operation matching the target virtual key.

10. The terminal device according to claim 9, wherein the triggering adjustment of a key state of a target virtual key when the target angle reaches a trigger threshold comprises:

increasing, when the target angle reaches the trigger threshold, an energy value of an energy bar corresponding to a game prop controlled by the target virtual key by a first target value within a unit time to obtain an accumulated energy value; and adjusting, when the accumulated energy value reaches a preset energy threshold, the key state of the target virtual key from a non-touch-enabled state to the touch-enabled state.

11. The terminal device according to claim 10, wherein the plurality of operations further comprise:

after increasing an energy value of an energy bar corresponding to a game prop controlled by the target virtual key by a first target value within a unit time to obtain an accumulated energy value:

keeping, when the accumulated energy value does not reach the preset energy threshold, the key state of the target virtual key being the non-touch-enabled state, and continuously detecting the energy value of the energy bar.

12. The terminal device according to claim 9, wherein the detecting a target angle generated by a target object controlled by a user of the terminal device during execution of a target action comprises:

obtaining a first operation instruction generated by performing a touch and hold operation on a first virtual key and a second virtual key in a man-machine interaction interface presented on the client, the first virtual key being configured to adjust the forward orientation of the target object, and the second virtual key being configured to trigger the target object to perform the target action;

controlling, in response to the first operation instruction, the target object to perform the target action, the target action comprising: a first target sub-action performed by controlling the target object according to the forward orientation as a first direction, and a second target sub-action performed by controlling the target object according to the forward orientation as a second direction; and detecting the target angle generated by the target object during execution of the first target sub-action and the second target sub-action.

13. The terminal device according to claim 12, wherein the plurality of operations further comprise:

during the detecting a target angle generated by a target object controlled by a user of the terminal device during execution of a target action:

obtaining, during controlling the target object to perform the first target sub-action, a first action parameter value corresponding to the first target sub-action;

increasing, according to a second target value matching the first action parameter value, an energy value of an energy bar corresponding to a game prop controlled by the target virtual key, the second target value being an energy value added in the energy bar within a unit time during execution of the first target sub-action;

obtaining, during controlling the target object to perform the second target sub-action, a second action parameter value corresponding to the second target sub-action; and increasing, according to a third target value matching the second action parameter value, an energy value of an energy bar corresponding to a game prop controlled by the target virtual key, the third target value being an energy value added in the energy bar within a unit time during execution of the second target sub-action.

14. The terminal device according to claim 12, wherein the plurality of operations further comprise:

before the triggering adjustment of a key state of a target virtual key:

detecting the target angle generated by the target object during switching from the first target sub-action to the second target sub-action; and determining, when it is detected that the target angle is less than or equal to 0, that the target angle reaches the trigger threshold.

15. The terminal device according to claim 9, wherein the controlling the target object to perform a target operation matching the target virtual key comprises:
   controlling the target object to perform a release operation on a special skill matching the target virtual key, and adjusting the key state of the target virtual key to the non-touch-enabled state, the special skill being used for assisting the target object in completing the round of game.

16. The terminal device according to claim 15, wherein the controlling the target object to perform a release operation on a special skill matching the target virtual key comprises:
   controlling the target object to perform an acceleration operation matching the target virtual key.

17. A non-transitory computer readable storage medium, comprising a plurality of computer programs that, when executed by a processor of a terminal device, cause the terminal device to perform a plurality of operations including:
   detecting, in a running process of a round of game, a target angle generated by a target object controlled by a user of the terminal device during execution of a target action, the target angle being an included angle between a forward orientation of the target object and a sliding direction of the target object;
   triggering adjustment of a key state of a target virtual key when the target angle reaches a trigger threshold;
   detecting, when the key state of the target virtual key is a touch-enabled state, a touch operation performed on the target virtual key; and
   controlling, in response to the touch operation, the target object to perform a target operation matching the target virtual key.

18. The non-transitory computer readable storage medium according to claim 17, wherein the triggering adjustment of a key state of a target virtual key when the target angle reaches a trigger threshold comprises:
   increasing, when the target angle reaches the trigger threshold, an energy value of an energy bar corresponding to a game prop controlled by the target virtual key by a first target value within a unit time to obtain an accumulated energy value; and
   adjusting, when the accumulated energy value reaches a preset energy threshold, the key state of the target virtual key from a non-touch-enabled state to the touch-enabled state.

19. The non-transitory computer readable storage medium according to claim 18, wherein the plurality of operations further comprise:
   after increasing an energy value of an energy bar corresponding to a game prop controlled by the target virtual key by a first target value within a unit time to obtain an accumulated energy value:
   keeping, when the accumulated energy value does not reach the preset energy threshold, the key state of the target virtual key being the non-touch-enabled state, and continuously detecting the energy value of the energy bar.

20. The non-transitory computer readable storage medium according to claim 17, wherein the detecting a target angle generated by a target object controlled by a user of the terminal device during execution of a target action comprises:
   obtaining a first operation instruction generated by performing a touch and hold operation on a first virtual key and a second virtual key in a man-machine interaction interface presented on the client, the first virtual key being configured to adjust the forward orientation of the target object, and the second virtual key being configured to trigger the target object to perform the target action;
   controlling, in response to the first operation instruction, the target object to perform the target action, the target action comprising: a first target sub-action performed by controlling the target object according to the forward orientation as a first direction, and a second target sub-action performed by controlling the target object according to the forward orientation as a second direction; and
   detecting the target angle generated by the target object during execution of the first target sub-action and the second target sub-action.

\* \* \* \* \*